(12) United States Patent
Murata et al.

(10) Patent No.: US 12,296,762 B2
(45) Date of Patent: May 13, 2025

(54) WIRE HARNESS

(71) Applicant: SUMITOMO WIRING SYSTEMS, LTD., Yokkaichi (JP)

(72) Inventors: Takuya Murata, Yokkaichi (JP); Yuji Nishi, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 135 days.

(21) Appl. No.: 17/800,420

(22) PCT Filed: Feb. 16, 2021

(86) PCT No.: PCT/JP2021/005606
§ 371 (c)(1),
(2) Date: Aug. 17, 2022

(87) PCT Pub. No.: WO2021/166874
PCT Pub. Date: Aug. 26, 2021

(65) Prior Publication Data
US 2023/0079073 A1 Mar. 16, 2023

(30) Foreign Application Priority Data
Feb. 20, 2020 (JP) .................. 2020-027197

(51) Int. Cl.
*B60R 16/02* (2006.01)
*H02G 3/04* (2006.01)
*H02G 3/32* (2006.01)

(52) U.S. Cl.
CPC ...... *B60R 16/0207* (2013.01); *B60R 16/0215* (2013.01); *H02G 3/04* (2013.01); *H02G 3/32* (2013.01)

(58) Field of Classification Search
CPC .......... H02G 3/04; H02G 3/32; B60R 6/0207; B60R 6/0215; H01B 7/0045
See application file for complete search history.

(56) References Cited

U.S. PATENT DOCUMENTS 9,488,201 B2 * 11/2016 Sumners .................. F16B 2/22
11,826,537 B2 * 11/2023 Roddy .................. A61M 39/08
(Continued)

FOREIGN PATENT DOCUMENTS

| JP | 2003-61222 A | 2/2003 |
|---|---|---|
| JP | 2009-068515 A | 4/2009 |

(Continued)

OTHER PUBLICATIONS

Apr. 20, 2021 International Search Report issued in International Patent Application No. PCT/JP2021/005606.

*Primary Examiner* — Paresh Paghadal
(74) *Attorney, Agent, or Firm* — Oliff PLC

(57) ABSTRACT

A wire harness including an electric wire; a cover that covers an outer circumferential surface of the electric wire; and a clamp for fixing the electric wire to a vehicle body, wherein: a surface of the cover that is provided on a side opposite to the electric wire includes an uneven surface with a plurality of irregularities, and the clamp includes: an elastic member that is made of an elastic body and is brought into contact with the uneven surface; and a fixing member that presses the elastic member against the uneven surface and is fixed to the vehicle body.

6 Claims, 4 Drawing Sheets

(56) References Cited

U.S. PATENT DOCUMENTS

| | | | | |
|---|---|---|---|---|
| 2009/0218002 A1* | 9/2009 | Kashihara | ............ | D03D 1/0043 139/384 R |
| 2010/0089515 A1* | 4/2010 | Malloy | ................ | D03D 1/0043 156/56 |
| 2012/0037263 A1* | 2/2012 | Malloy | .................. | D03D 15/00 28/165 |
| 2013/0228248 A1* | 9/2013 | Malloy | ................ | D03D 1/0043 139/35 |
| 2015/0096802 A1* | 4/2015 | Itani | .................... | B60R 16/0215 174/72 A |
| 2015/0152980 A1 | 6/2015 | Okura | | |
| 2018/0068765 A1* | 3/2018 | Yamamoto | ........... | H01B 7/0045 |
| 2018/0287357 A1* | 10/2018 | Knudson | .............. | H02G 3/0481 |

FOREIGN PATENT DOCUMENTS

| | | |
|---|---|---|
| WO | 2018/168399 A1 | 9/2018 |
| WO | 2019/188515 A1 | 10/2019 |

* cited by examiner

WIRE HARNESS

BACKGROUND

The present disclosure relates to a wire harness.

Conventionally, a wire harness that is mounted in a vehicle includes: an electric wire that electrically connects a plurality of electric devices; and a clamp that fixes the electric wire to a vehicle body of the vehicle. As disclosed in, for example, WO 2018/168399, the clamp may include: an elastic member through which the electric wire is inserted; and a fixing member that holds the elastic member and fixes the elastic member to the vehicle body. The outer circumferential surface of the electric wire at a portion that is inserted through the elastic member is elastically held by the elastic member.

SUMMARY

With a wire harness that includes a clamp as described above, there may be a case where the electric wire moves relative to the clamp in the axis direction of the electric wire when the vehicle vibrates or when a force is applied to the electric wire, or the like. If the electric wire moves relative to the clamp in the axis direction of the electric wire, the electric wire may come into contact with an object such as a device that is provided in the vicinity of the wire harness. For this reason, there has been a need to suppress a situation in which the electric wire moves relative to the clamp in the axis direction of the electric wire.

An exemplary aspect of the disclosure provides a wire harness, with which it is possible to suppress a situation in which the electric wire moves relative to the clamp in the axis direction of the electric wire.

A wire harness according to the present disclosure includes: an electric wire; a cover that covers an outer circumferential surface of the electric wire; and a clamp for fixing the electric wire to a vehicle body, wherein: a surface of the cover that is provided on a side opposite to the electric wire includes an uneven surface with a plurality of irregularities, and the clamp includes: an elastic member that is made of an elastic body and is brought into contact with the uneven surface; and a fixing member that presses the elastic member against the uneven surface and is fixed to the vehicle body.

With the wire harness according to the present disclosure, it is possible to suppress a situation in which the electric wire moves relative to the clamp in the axis direction of the electric wire.

DETAILED DESCRIPTION OF EMBODIMENTS

Figure 1:
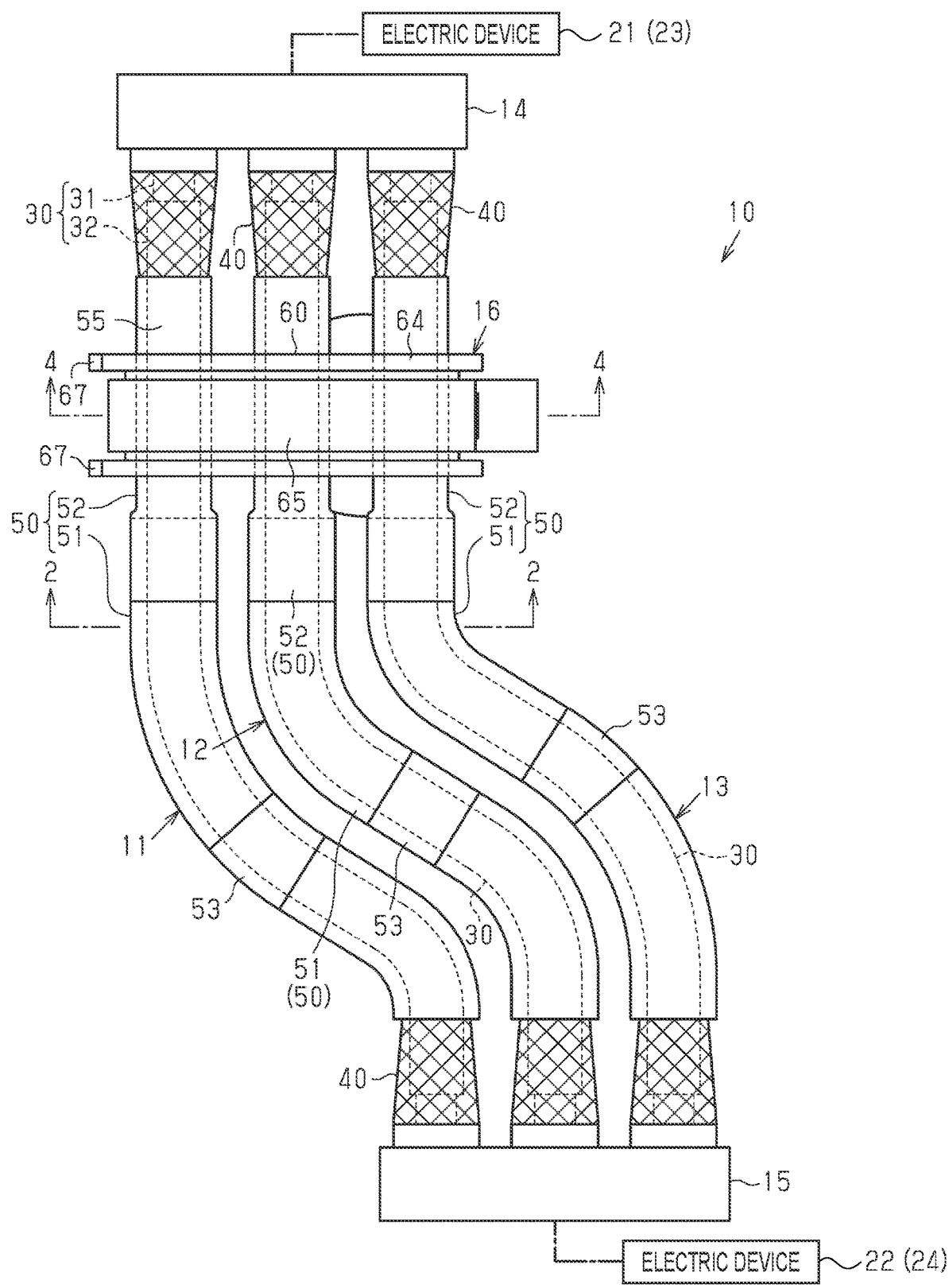
FIG. 1 is a schematic view of a wire harness according to an embodiment.

Description of Embodiment of the Present Disclosure

First, aspects of an embodiment according to the present disclosure will be listed and described.

[1] A wire harness according to the present disclosure is a wire harness including: an electric wire; a covering member that covers an outer circumferential surface of the electric wire; and a clamp for fixing the electric wire to a vehicle body, wherein a surface of the covering member that is provided on a side opposite to the electric wire includes an uneven surface with a large number of fine irregularities, and the clamp includes: an elastic member that is made of an elastic body and is brought into contact with the uneven surface; and a fixing member that presses the elastic member against the uneven surface and is fixed to the vehicle body.

With this configuration, the elastic member is pressed against the uneven surface of the covering member, and thus a friction force between the covering member and the elastic member is increased. Accordingly, the covering member that covers the outer circumferential surface of the electric wire is unlikely to move relative to the clamp in the axis direction of the electric wire. As a result, it is possible to suppress a situation in which the electric wire moves relative to the clamp in the axis direction of the electric wire.

[2] It is preferable that the covering member includes: a cylindrical exterior member that covers the outer circumferential surface of the electric wire; and a tape member that fixes the exterior member to the electric wire by being wound around an outer circumference of the exterior member and an outer circumference of the electric wire, the tape member includes a substrate that is made of a woven fabric or a nonwoven fabric and has an adhesive-applied surface in a thickness direction of the tape member, and the uneven surface is the other surface of the substrate in the thickness direction.

With this configuration, the substrate is made of a woven fabric or a nonwoven fabric, and thus the uneven surface can be easily formed on the tape member. Also, the tape member for fixing the exterior member to the electric wire includes the uneven surface, and the elastic member is pressed against the uneven surface. Accordingly, it is possible to further suppress a situation in which the electric wire moves relative to the clamp in the axis direction of the electric wire.

[3] It is preferable that the tape member is wound around the exterior member only at one of two end portions of the exterior member in an axis direction of the exterior member.

With this configuration, the other one of the two end portions of the exterior member in the axis direction is not closed by the tape member, and is thus open. Accordingly, it is possible to cause heat generated in the electric wire when the electric wire is energized to escape from the open end portion of the exterior member to the outside of the exterior member. As a result, heat dissipation of the wire harness can be improved.

[4] It is preferable that the exterior member is made of a sheet-like woven fabric or a sheet-like nonwoven fabric.

With this configuration, the exterior member that is made of a sheet-like woven fabric or a sheet-like nonwoven fabric is more flexible than synthetic resin corrugated tubes and the like that are formed using molds. Accordingly, the degree of freedom in routing the wire harness can be increased. Also, the exterior member is made of a woven fabric or a nonwoven fabric, and thus air permeable. Accordingly, the exterior member can easily cause heat generated in the electric wire when the electric wire is energized to escape to the outside. Accordingly, the heat dissipation of the wire harness can be further improved.

[5] It is preferable that the wire harness includes a braided wire that is composed of conductive strands that are braided into a cylindrical shape, and the braided wire is provided within the exterior member and the tape member and covers the outer circumference of the electric wire.

With this configuration, the braided wire is provided within the exterior member, and thus deformation toward the outer circumference side of the electric wire is restricted by the exterior member. Accordingly, it is possible to suppress a situation in which the braided wire comes into contact with an object such as a device that is provided in the vicinity of the wire harness.

[6] It is preferable that the covering member includes a cylindrical exterior member that is made of a sheet-like woven fabric or a sheet-like nonwoven fabric and covers the outer circumferential surface of the electric wire, and the uneven surface is an outer circumferential surface of the exterior member.

With this configuration, the exterior member is made of a woven fabric or a nonwoven fabric. Accordingly, the uneven surface is easily formed on the outer circumferential surface of the exterior member. Also, the elastic member is pressed against the uneven surface of the exterior member, and thus a friction force between the exterior member and the elastic member can be increased. Accordingly, it is possible to easily suppress a situation in which the electric wire moves relative to the clamp in the axis direction of the electric wire.

[7] It is preferable that the wire harness includes a braided wire composed of conductive strands that are braided into a cylindrical shape, a plurality of electric wires that includes the electric wire, and a number of covering members that includes the covering member that is the same as the number of electric wires, the plurality of electric wires are each individually covered by the covering members, the plurality of electric wires are collectively provided within the braided wire together with the covering members, and the elastic member is brought into contact with the uneven surfaces of the covering members exposed to outside of the braided wire from holes of a mesh made of the strands.

With this configuration, a plurality of electric wires are collectively covered by one braided wire, and thus the number of components can be reduced as compared with a configuration in which a plurality of electric wires are each independently covered by braided wires.

DETAILED DESCRIPTION OF EMBODIMENT OF THE PRESENT DISCLOSURE

A specific example of a wire harness according to the present disclosure will be described below with reference to the accompanying drawings. It is to be noted that the present disclosure is not limited to examples given below, the scope of the present disclosure is indicated by the appended claims, and all changes that come within the meaning and range of equivalency of the claims are intended to be embraced within the scope of the present disclosure.

Hereinafter, a wire harness according to an embodiment will be described. It is to be noted that, for the sake of facilitating the understanding of the description, in the accompanying drawings, some structural elements may be shown in an exaggerated or simplified manner. Also, the dimensional ratio of structural elements may be different from the actual dimensional ratio, and also may vary from drawing to drawing.

Configuration of Wire Harness 10

A wire harness 10 shown in FIG. 1 electrically connects electric devices mounted in a vehicle. The wire harness 10 is mounted in a vehicle such as, for example, a hybrid vehicle or an electric vehicle. The wire harness 10 includes a first conductive path 11, a second conductive path 12, a third conductive path 13, a connector 14 that is attached to one end portions of the conductive paths 11, 12, and 13, a connector 15 that is attached to the other end portions of the conductive paths 11, 12, and 13, and a clamp 16 for fixing the conductive paths 11, 12, and 13 to a vehicle body of the vehicle.

The conductive paths 11, 12, and 13 are electrically connected to an electric device 21 via the connector 14, and also electrically connected to an electric device 22 via the connector 15. In the present embodiment, the electric device 21 is an inverter 23. The inverter 23 is electrically connected to a high-voltage battery (not shown) that can supply voltage at, for example, a hundred and several tens to several hundred volts. The inverter 23 generates AC power from DC power of the high-voltage battery. Also, in the present embodiment, the electric device 22 is a wheel driving motor 24 that serves as a power source for the vehicle to run. The AC power generated by the inverter 23 is supplied to the motor 24 via the wire harness 10.

Configuration of Conductive Paths 11, 12, and 13

In the present embodiment, the second conductive path 12 and the third conductive path 13 have the same configuration as the first conductive path 11. Accordingly, only the configuration of the first conductive path 11 will be described. Reference numerals that are assigned to the structural elements of the first conductive path 11 are also given to the second conductive path 12 and the third conductive path 13, and a description of the configuration of the second conductive path 12 and the third conductive path 13 will be omitted.

Figure 2:
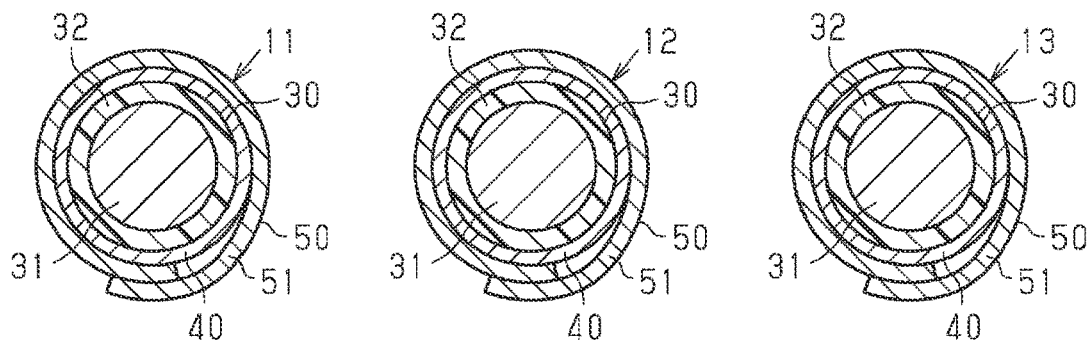
FIG. 2 is a schematic end view of the wire harness according to the embodiment.

As shown in FIGS. 1 and 2, the first conductive path 11 includes an electric wire 30, a braided wire 40 that covers an outer circumference of the electric wire 30, and a covering member 50 (cover) that covers an outer circumferential surface of the electric wire 30. FIG. 2 is an end view taken along line 2-2 in FIG. 1.

Configuration of Electric Wire 30

The electric wire 30 is a coated electric wire that includes a core wire 31 that is made of a conductor and an insulation coating 32 that covers an outer circumference of the core wire 31.

As the core wire 31, for example, a twisted wire that is composed of a plurality of metal strands that are twisted together, a columnar conductor that is composed of a columnar metal rod that has a solid structure, a cylindrical conductor that has a hollow structure, or the like can be used. Alternatively, as the core wire 31, for example, a combination of a plurality of types of conductors such as a twisted wire, a columnar conductor, and a cylindrical conductor may be used. The columnar conductor may be, for example, a single core wire, a bus bar, or the like. The core wire 31 of the present embodiment is a twisted wire. As the material of the core wire 31, for example, metal materials such as a copper-based metal material and an aluminum-based metal material can be used.

A cross section (specifically, a transverse cross-section) of the core wire 31 taken along a plane that is orthogonal to the lengthwise direction of the core wire 31, or in other words, the axis direction of the electric wire 30 can have any shape. The transverse cross-section of the core wire 31 may have, for example, a circular shape, a semicircular shape, a polygonal shape, a square shape, a flat shape, or the like. The transverse cross-section of the core wire 31 of the present embodiment has a circular shape.

The insulation coating 32 covers, for example, the entire outer circumferential surface of the core wire 31 in the circumferential direction of the core wire 31. In the present embodiment, the insulation coating 32 has a cylindrical shape that extends in the axis direction of the electric wire 30. The insulation coating 32 is made of, for example, an insulating material such as a synthetic resin. As the material of the insulation coating 32, for example, a synthetic resin composed mainly of a polyolefin resin such as cross-linked polyethylene or cross-linked polypropylene may be used. As the material of the insulation coating 32, only one material may be used, or two or more materials may be used in combination as appropriate.

At two end portions of the electric wire 30 in the axis direction of the electric wire 30, the insulation coating 32 is removed, and thus the core wire 31 is exposed. One end portion of the core wire 31 in the axis direction of the electric wire 30 is electrically connected to a connection terminal (not shown) of the connector 14. The other end portion of the core wire 31 in the axis direction of the electric wire 30 is electrically connected to a connection terminal (not shown) of the connector 15.

Configuration of Braided Wire 40

The braided wire 40 is composed of conductive strands that are braided into a cylindrical shape. In the diagrams, the braided wire 40 is shown in a simplified manner. The strands of the present embodiment are metal strands. As the material of the metal strands, for example, metal materials such as a copper-based metal material and an aluminum-based metal material can be used. The braided wire 40 is flexible.

The electric wire 30 is provided in an inner space of the braided wire 40. The braided wire 40 covers the electric wire 30 entirely from one end to the other end of the electric wire 30 in the axis direction of the electric wire 30. Also, the braided wire 40 covers the outer circumferential surface of the electric wire 30 entirely in the circumferential direction of the electric wire 30. The braided wire 40 is brought into contact with the outer circumferential surface of the electric wire 30. One end portion of the braided wire 40 in the axis direction of the electric wire 30 is electrically connected to a conductive member of the connector 14. The other end portion of the braided wire 40 in the axis direction of the electric wire 30 is electrically connected to a conductive member of the connector 15.

Configuration of Covering Member 50

The covering member 50 of the present embodiment covers the outer circumferential surface of the electric wire 30 from the outside of the braided wire 40. The covering member 50 has a cylindrical shape that extends in the axis direction of the electric wire 30 as a whole. The covering member 50 of the present embodiment includes a cylindrical exterior member 51 (exterior) that covers the outer circumferential surface of the electric wire 30, and a tape member 52 (tape) that fixes the exterior member 51 to the electric wire 30 by being wound around the outer circumference of the exterior member 51 and the outer circumference of the electric wire 30.

Configuration of Exterior Member 51

The exterior member 51 has a cylindrical shape that extends in the axis direction of the electric wire 30 as a whole. The exterior member 51 is made of a sheet-like woven fabric or a sheet-like nonwoven fabric. In the present embodiment, the exterior member 51 is formed by rolling a sheet-like woven fabric into a cylindrical shape. As the material of the exterior member 51, for example, a PE (polyester) fiber such as a PET (polyethylene terephthalate) fiber, an aramid fiber, or the like can be used. The material of the exterior member 51 is not limited to a PE fiber and an aramid fiber, and any other fiber materials may be used. The exterior member 51 of the present embodiment is a twisted tube made of a PE fiber.

The electric wire 30 and the braided wire 40 are provided. In an inner space of the exterior member 51. The exterior member 51 of the present embodiment covers the outer circumferential surface of the electric wire 30 from the outside of the braided wire 40 by being attached to the electric wire 30 from the outside of the braided wire 40. Accordingly, the braided wire 40 is provided within the exterior member 51 and covers the outer circumference of the electric wire 30. The exterior member 51 is attached to the electric wire 30 such that the axis direction of the exterior member 51 substantially matches the axis direction of electric wire 30.

The exterior member 51 covers the outer circumferential surface of the electric wire 30 entirely in the circumferential direction of the electric wire 30. The length of the exterior member 51 in the axis direction is shorter than the length of the electric wire 30 and the length of the braided wire 40 in the axis direction of the electric wire 30. Furthermore, in the present embodiment, the length of the exterior member 51. In the axis direction is shorter than the length of the insulation coating 32 in the axis direction of the electric wire 30. Two end portions of each of the electric wire 30 and the braided wire 40 in the axis direction of the electric wire 30 protrude outward of the exterior member 51 from two end portions of the exterior member 51 in the axis direction. Furthermore, in the present embodiment, two end portions of the insulation coating 32 in the axis direction of the electric wire 30 protrude outward of the exterior member 51 from the two end portions of the exterior member 51 in the axis direction.

An adhesive tape 53 for preventing the exterior member 51 from being detached from the electric wire 30 is wound around the exterior member 51 at a center portion of the exterior member 51. The position in the exterior member 51 where the adhesive tape 53 is wound may be changed as appropriate, Also, the adhesive tape 53 may be omitted.

Configuration of Tape Member 52

Figure 4:
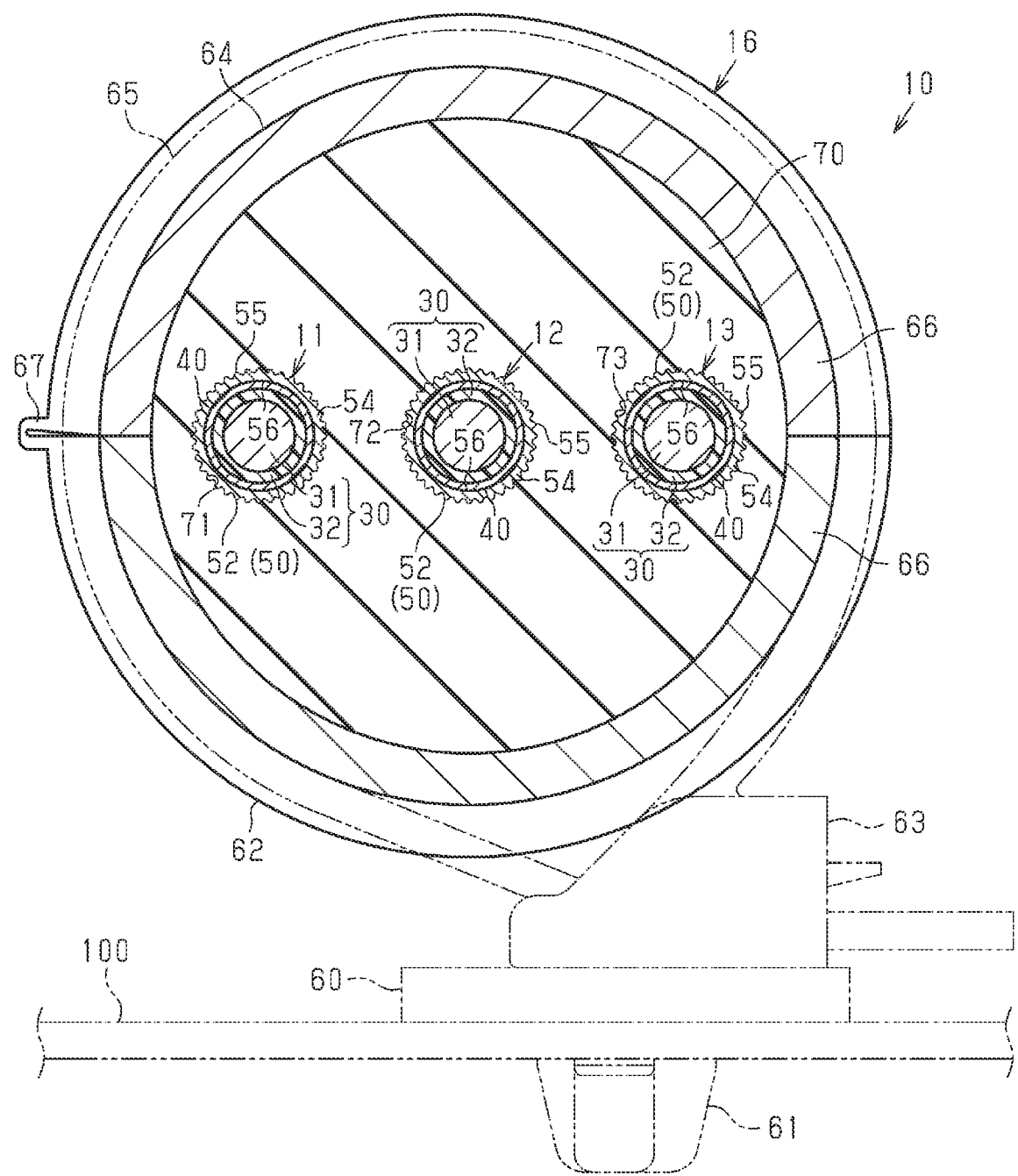
FIG. 4 is a schematic cross-sectional view of the wire harness according to the embodiment.

As shown in FIGS. 1 and 4, the tape member 52 includes a substrate 54 that is made of a woven fabric or a nonwoven fabric and has an adhesive-applied surface in the thickness direction. FIG. 4 is a cross-sectional view taken along line 4-4 in FIG. 1. The substrate 54 of the present embodiment is made of a woven fabric. As the substrate 54 of the present embodiment, a woven fabric composed mainly of an acetate fiber is used.

The other surface of the substrate 54 in the thickness direction is an uneven surface 55 that has a large number of fine irregularities. In FIG. 4, the fine irregularities of the uneven surface 55 are shown in an exaggerated manner. The uneven surface 55 is a surface that is provided on a side opposite to an adhesive surface 56 of the substrate 54 to which an adhesive is applied. In the present embodiment, the large number of fine irregularities of the uneven surface 55 are formed as a result of the substrate 54 being made using a woven fabric. That is, the large number of fine irregularities of the uneven surface 55 are formed due to surface properties of the woven fabric.

The tape member 52 is wound around the exterior member 51 only at one of two end portions of the exterior member 51 in the axis direction. In the present embodiment, the tape member 52 is wound at one of the two end portions of the exterior member 51 in the axis direction that is closer to the connector 14. On the other hand, the tape member 52 is not wound at the other one of the end portions of the exterior member 51 in the axis direction that is closer to the connector 15. For this reason, an opening portion at the end portion of the exterior member 51 in the axis direction that is closer to the connector 15 communicates the inside and the outside of the exterior member 51.

The tape member 52 is spirally wound around an outer circumferential surface of the end portion of the exterior member 51 in the axis direction that is closer to the connector 14, and the outer circumference of the electric wire 30 and the braided wire 40 that protrude outward of the exterior member 51 from the end portion. For this reason, the tape member 52 has a cylindrical shape that surrounds the outer circumference of the electric wire 30. The adhesive surface 56 of the tape member 52 is adhesively attached to the outer circumferential surface of the exterior member 51 and the braided wire 40. The uneven surface 55 of the tape member 52 faces the opposite side to the electric wire 30. That is, a surface of the tape member 52 that is wound into a cylindrical shape and is provided on a side opposite to the electric wire 30, or in other words, an outer circumferential surface of the tape member 52 is formed by the uneven surface 55.

Configuration of Clamp 16

Figure 3:
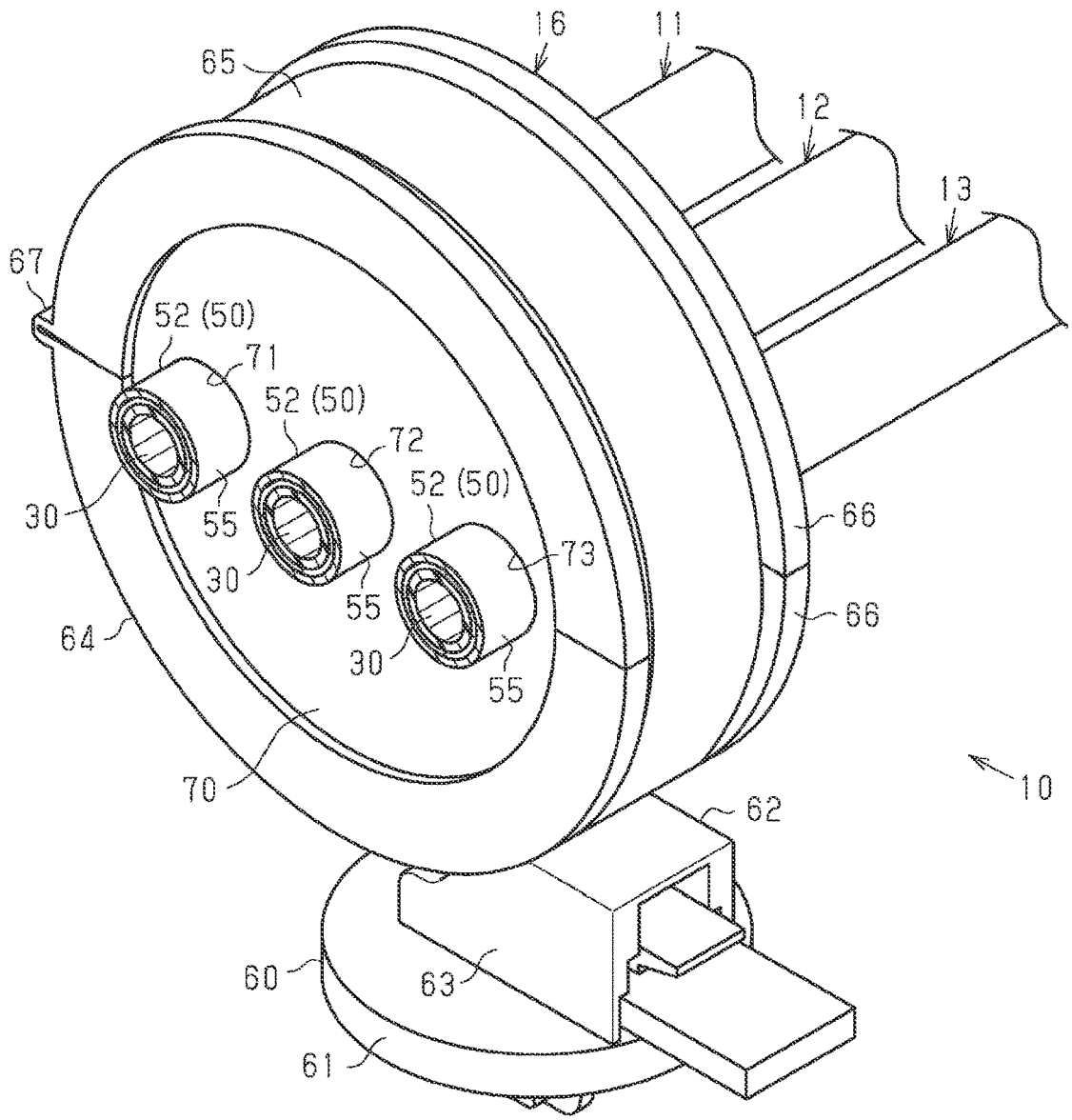
FIG. 3 is a schematic perspective view of the wire harness according to the embodiment.

As shown in FIGS. 3 and 4, the clamp 16 fixes the electric wires 30 to the vehicle body. The clamp 16 includes: a fixing member 60 that is fixed to a vehicle body panel 100 of the vehicle; and an elastic member 70 that is pressed against the conductive paths 11, 12, and 13 by the fixing member 60 from the outer circumference side of the conductive paths 11, 12, and 13.

Configuration of Elastic Member 70

The elastic member 70 is made of an elastic body. As the elastic body, for example, an elastomer can be used. Preferably, as the elastic body, for example, a thermosetting elastomer such as an EPDM (ethylene propylene diene rubber), a silicone rubber, or a butyl rubber can be used. The elastic member 70 of the present embodiment is made of an EPDM.

The elastic member 70 has a disc-like shape. The elastic member 70 includes three insertion holes 71, 72, and 73 that are arranged in the diameter direction. In the present embodiment, the insertion holes 71, 72, and 73 have a circular shape as viewed from the thickness direction of the elastic member 70.

The first conductive path 11 is inserted through the insertion hole 71. A portion of the first conductive path 11 around which the tape member 52 is wound is provided in an inner space of the insertion hole 71. In the present embodiment, in the inner space of the insertion hole 71, a portion of the first conductive path 11 where the electric wire 30, the braided wire 40, and the tape member 52 are layered, but the exterior member 51 is not overlaid is provided. An inner circumferential surface of the insertion hole 71 can be brought into contact with the uneven surface 55 that constitutes the outer circumferential surface of the tape member 52 of the first conductive path 11. That is, the elastic member 70 can be brought into contact with the uneven surface 55 of the tape member 52 of the first conductive path 11.

The second conductive path 12 is inserted through the insertion hole 72. A portion of the second conductive path 12 around which the tape member 52 is wound is provided in an inner space of the insertion hole 72, In the present embodiment, in the inner space of the insertion hole 72, a portion of the second conductive path 12 where the electric wire 30, the braided wire 40, and the tape member 52 are layered, but the exterior member 51 is not overlaid is provided. An inner circumferential surface of the insertion hole 72 can be brought into contact with the uneven surface 55 that constitutes the outer circumferential surface of the tape member 52 of the second conductive path 12. That is, the elastic member 70 can be brought into contact with the uneven surface 55 of the tape member 52 of the second conductive path 12.

The third conductive path 13 is inserted through the insertion hole 73. A portion of the third conductive path 13 around which the tape member 52 is wound is provided in an inner space of the insertion hole 73. In the present embodiment, in the inner space of the insertion hole 73, a portion of the third conductive path 13 where the electric wire 30, the braided wire 40, and the tape member 52 are layered, but the exterior member 51 is not overlaid is provided. An inner circumferential surface of the insertion hole 73 can be brought into contact with the uneven surface 55 that constitutes the outer circumferential surface of the tape member 52 of the third conductive path 13. That is, the elastic member 70 can be brought into contact with the uneven surface 55 of the tape member 52 of the third conductive path 13.

In the elastic member 70 before being held by the fixing member 60, the inner diameter of the insertion holes 71, 72, and 73 may be smaller than, equal to, or larger than the outer diameter of a portion provided in the inner space of the insertion holes 71, 72, and 73 of the conductive paths 11, 12, and 13. However, the inner diameter of the insertion holes 71, 72, and 73 is set such that, in a state in which the elastic member 70 is held by the fixing member 60, the inner circumferential surfaces of the insertion holes 71, 72, and 73 can be brought into contact with and pressed against the uneven surfaces 55 of the conductive paths 11, 12, and 13, respectively.

Configuration of Fixing Member 60

The fixing member 60 includes a fixing portion 61 that is fixed to the vehicle body panel 100, and a holding portion 62 that holds the electric wires 30.

The fixing portion 61 is fixed to the vehicle body panel 100 and supports the holding portion 62. The fixing portion 61 is fixed to the vehicle body panel 100 such that the fixing portion 61 cannot move relative to the vehicle body panel 100.

The holding portion 62 includes a lock portion 63 that is supported by the fixing portion 61, a main body portion 64 that internally holds the elastic member 70, and a fastening member 65 that fixes the main body portion 64 to the lock portion 63.

The main body portion 64 has a cylindrical shape as a whole. The inner diameter of the main body portion 64 is slightly smaller than the outer diameter of the elastic member 70. The main body portion 64 includes a pair of gripping bodies 66 that are formed by dividing the main body portion 64 in the circumferential direction into halves. Each of the gripping bodies 66 has a semi-circular arc-like shape when viewed from the axis direction of the main body portion 64. The two gripping bodies 66 are connected with a flexible hinge 67 that is provided at one end portion of the main body portion 64 in the diameter direction. The two gripping bodies 66 can swing relative to each other about the hinge 67. That is, the two gripping bodies 66 can be brought into a closed state in which the gripping bodies 66 form a cylindrical shape or an open state in which end portions of the two gripping bodies 66 that are provided on a side opposite to the hinge 67 in the diameter direction are spaced apart from each other. The elastic member 70 is provided within the pair of gripping bodies 66, or in other words, in an inner space of the main body portion 64. When the two gripping bodies 66 is in the closed state, the main body portion 64 presses the elastic member 70 radially inward. That is, when the two gripping bodies 66 is in the closed state, the main body portion 64 presses the elastic member 70 against the uneven surfaces 55 of the conductive paths 11, 12, and 13.

The fastening member 65 has a strip-like shape. Two end portions of the fastening member 65 in the lengthwise direction can be fixed to the lock portion 63. The fastening member 65 is wound in one layer around the outer circumferential surface of the main body portion 64, and the two end portions of the fastening member 65 in the lengthwise direction are fixed to the lock portion 63. The fastening member 65 fastens the main body portion 64 to maintain the closed state of the two gripping bodies 66.

The operations of the present embodiment will be described.

In the first conductive path 11, the inner circumferential surface of the insertion hole 71 formed in the elastic member 70 is pressed against the uneven surface 55 of the tape member 52. That is, the elastic member 70 is pressed against the uneven surface 55. For this reason, a friction force between the tape member 52 and the elastic member 70 is increased.

Also, in a portion of the first conductive path 11 that is provided within the insertion hole 71, the tape member 52 and the braided wire 40 are pressed toward the electric wire 30 by the elastic member 70, and thus the braided wire 40 is embedded into the insulation coating 32. Accordingly, a relative movement between the braided wire 40 and the electric wire 30 in the axis direction of the electric wire 30 is suppressed.

Also, as a result of the braided wire 40 being embedded into the insulation coating 32, the insulation coating 32 enters the holes of a mesh made of strands that constitute the braided wire 40. For this reason, the outer circumferential surface of the insulation coating 32 moves toward the outer circumference side relative to the braided wire 40. Accordingly, the adhesive surface 56 of the tape member 52 is easily adhesively attached to the insulation coating 32 that is exposed from the holes of the mesh of strands that constitute the braided wire 40. That is, the adhesive surface 56 of the tape member 52 can be easily adhesively attached to the outer circumferential surface of the electric wire 30. Also, as a result of the adhesive surface 56 of the tape member 52 being adhesively attached to the insulation coating 32 that is exposed from the holes of the mesh of strands, a relative movement between the tape member 52 and the electric wire 30 in the axis direction of the electric wire 30, or in other words, a relative movement between the covering member 50 and the electric wire 30 in the axis direction of the electric wire 30 is suppressed. In this way, the adhesive surface 56 of the tape member 52 can be adhesively attached to the insulation coating 32 that is exposed from the holes of the mesh of strands that constitute the braided wire 40, and thus even when the braided wire 40 is provided between the tape member 52 and the outer circumferential surface of the electric wire 30, the electric wire 30 is unlikely to move relative to the covering member 50 in the axis direction of the electric wire 30. In the diagrams, the braided wire 40 is shown in a simplified manner, and thus the adhesive surface 56 of the tape member 52 appears to be not adhesively attached to the outer circumferential surface of the electric wire 30. However, as described above, the adhesive surface 56 of the tape member 52 is actually adhesively attached to the outer circumferential surface of the electric wire 30 in a portion of the first conductive path 11 that is provided within the insertion hole 71. In the present embodiment, the exterior member 51 is fixed to the electric wire 30 as a result of the adhesive surface 56 of the tape member 52 being adhesively attached to the insulation coating 32 exposed from the holes of the mesh of strands that constitute the braided wire 40.

Also, in the first conductive path 11, the adhesive surface 56 of the tape member 52 is also adhesively attached to the braided wire 40, and thus a relative movement between the tape member 52 and the braided wire 40 in the axis direction of the electric wire 30, that is, a relative movement between the exterior member 51 and the braided wire 40 in the axis direction of the electric wire 30 is suppressed.

The same operations are performed in the second conductive path 12 and the third conductive path 13.

Advantageous effects of the present embodiment will be described, (1) A wire harness 10 includes an electric wire 30, a covering member 50 that covers an outer circumferential surface of the electric wire 30, and a clamp 16 for fixing the electric wire 30 to a vehicle body. A surface of the covering member 50 that is provided on a side opposite to the electric wire 30 includes an uneven surface 55 that has a large number of fine irregularities. The clamp 16 includes: an elastic member 70 that is made of an elastic body and is brought into contact with the uneven surface 55; and a fixing member 60 that presses the elastic member 70 against the uneven surface 55 and is fixed to the vehicle body.

With this configuration, the elastic member 70 is pressed against the uneven surface 55 of the covering member 50, and thus a friction force between the covering member 50 and the elastic member 70 is increased. Accordingly, the covering member 50 that covers the outer circumferential surface of the electric wire 30 is unlikely to move relative to the clamp 16 in the axis direction of the electric wire 30. As a result, it is possible to suppress a situation in which the electric wire 30 moves relative to the clamp 16 in the axis direction of the electric wire 30.

In the present embodiment, in each of conductive paths 11, 12, and 13, the uneven surface 55 is provided on a tape member 52 of the covering member 50. As a result of the elastic member 70 being pressed against the uneven surface 55 of the tape member 52, it is possible to suppress a situation in which the tape member 52 moves relative to the elastic member 70 in the axis direction of the electric wire 30. Accordingly, it is possible to suppress a situation in which each of the conductive paths 11, 12, and 13 moves relative to the clamp 16 in the axis direction of the electric wires 30. Thus, it is possible to suppress a situation in which, in each of the conductive paths 11, 12, and 13, the electric wire 30 moves relative to the clamp 16 in the axis direction of the electric wire 30.

(2) The covering member 50 includes: a cylindrical exterior member 51 that covers the outer circumferential surface of the electric wire 30; and the tape member 52 that is wound around an outer circumference of the exterior member 51 and an outer circumference of the electric wire 30 and fixes the exterior member 51 to the electric wire 30. The tape member 52 includes a substrate 54 that is made of a woven fabric and has an adhesive-applied surface in the thickness direction. The uneven surface 55 is the other surface of the substrate 54 in the thickness direction.

With this configuration, because the substrate 54 is made of a woven fabric, the uneven surface 55 can be easily formed on the tape member 52. Also, the tape member 52 that fixes the exterior member 51 to the electric wire 30 includes the uneven surface 55, and the elastic member 70 is pressed against the uneven surface 55. Accordingly, it is possible to further suppress a situation in which the electric wire 30 moves relative to the clamp 16 in the axis direction of the electric wire 30.

Also, the clamp 16 is attached to portions of the conductive paths 11, 12, and 13 around which the tape members 52 are wound, respectively. In each of the conductive paths 11, 12, and 13, the tape member 52 includes an adhesive surface 56 that is adhesively attached to the outer circumferential surface of the electric wire 30, and thus the clamp 16 is unlikely to move relative to the electric wire 30. Accordingly, it is possible to more effectively suppress a situation in which the electric wire 30 moves relative to the clamp 16 in the axis direction of the electric wire 30.

(3) The tape member 52 is wound around the exterior member 51 only at one of two end portions of the exterior member 51 in the axis direction.

With this configuration, the other one of the two end portions of the exterior member 51 in the axis direction is not closed by the tape member 52, and is thus open. In the present embodiment, in each of the conductive paths 11, 12, and 13, one of two end portions of the exterior member 51 in the axis direction that is closer to the connector 15 is not closed by the tape member 52, and is thus open, Accordingly, it is possible to cause heat generated in the electric wire 30 when the electric wire 30 is energized to escape from the open end portion of the exterior member 51 to the outside of the exterior member 51. As a result, heat dissipation of the wire harness 10 can be improved.

(4) The exterior member 51 is made of a sheet-like woven fabric. The exterior member 51 that is made of a sheet-like woven fabric is more flexible than synthetic resin corrugated tubes formed using molds. For this reason, each of the conductive paths 11, 12, and 13 can be bent at a curvature greater than that of corrugated tubes. Accordingly, the degree of freedom in routing the wire harness 10 can be increased.

Also, the exterior member 51 is made of a woven fabric, and thus air permeable. Accordingly, the exterior member 51 easily causes heat generated in the electric wire 30 when the electric wire 30 is energized to escape to the outside. Thus, the heat dissipation of the wire harness 10 can be further improved.

Also, generally speaking, in a corrugated tube, pointed corner portions may be formed at end portions in the axis direction of the corrugated tube. In contrast, a sheet-like woven fabric is softer than a corrugated tube, and thus pointed corner portions are unlikely to be formed at the end portions of the exterior member 51 in the axis direction. Accordingly, a situation is suppressed in which the insulation coating 32 of the electric wire 30 is scraped off by the end portions of the exterior member 51 in the axis direction when the wire harness 10 is vibrated due to vibration of the vehicle while running. Also, it is unnecessary to provide a configuration for suppressing a situation in which the insulation coating 32 is scraped off by the end portions of the exterior member 51 in the axis direction, and thus an increase in the number of components and an increased complexity of the structure of the wire harness 10 can be suppressed.

Also, in the present embodiment, the exterior member 51 covers the outer circumference of the braided wire 40. Pointed corner portions are unlikely to be formed at the end portions of the exterior member 51 in the axis direction, and thus a situation is suppressed in which the strands that constitute the braided wire 40 are broken by the end portions of the exterior member 51 in the axis direction when the wire harness 10 is vibrated due to vibration of the vehicle while running. Also, it is unnecessary to provide a configuration for suppressing a situation in which the strands that constitute the braided wire 40 are broken by the end portions of the exterior member 51 in the axis direction, and thus an increase in the number of components and an increased complexity of the structure of the wire harness 10 can be suppressed.

(5) The wire harness 10 includes the braided wire 40 that is composed of conductive strands that are braided into a cylindrical shape. The braided wire 40 is provided within the exterior member 51 and the tape member 52, and covers the outer circumference of the electric wire 30.

With this configuration, the braided wire 40 is provided within the exterior member 51, and thus deformation toward the outer circumference side of the electric wire 30 is restricted by the exterior member 51. Accordingly, it is possible to suppress a situation in which the braided wire 40 comes into contact with an object such as a device that is provided in the vicinity of the wire harness 10. As a result, it is possible to suppress a situation in which the strands that constitute the braided wire 40 come into contact with and are broken by an object in the vicinity of the wire harness 10, and thus a reduction in the shielding performance of the braided wire 40 can be suppressed. Also, it is possible to suppress the occurrence of noise caused by the braided wire 40 coming into contact with an object in the vicinity of the wire harness 10.

Also, the braided wire 40 can be brought into contact with the outer circumferential surface of the electric wire 30. The braided wire 40 of the present embodiment is made using metal strands. For this reason, heat generated in the electric wire 30 when the electric wire 30 is energized can be easily transferred from the electric wire 30 toward the braided wire 40. Accordingly, the heat dissipation of the wire harness 10 can be further improved.

The present embodiment can be carried out by making modifications as described below. The present embodiment and variations described below can be carried out by being combined unless they are technically contradictory to each other.

- The braided wire 40 may be a braided wire formed by braiding a metal strand and a resin strand in combination. That is, the braided wire 40 may be a braided wire formed by braiding a metal strand and a resin strand into a cylindrical shape. In this case, as the material of the metal strand, as in the embodiment described above, for example, metal materials such as a copper-based metal material and an aluminum-based metal material can be used. As the resin strand, for example, reinforcing fibers with excellent insulation properties and shear resistance such as a para-aramid fiber can be used.
- The exterior member 51 does not necessarily need to be formed using a sheet-like woven fabric or a sheet-like nonwoven fabric. It is sufficient that the exterior member 51 has a cylindrical shape that covers the outer circumferential surface of the electric wire 30. The exterior member 51 may be, for example, a flexible corrugated tube.
- The tape member 52 may be wound around both of two end portions of the exterior member 51 in the axis direction. That is, the two end portions of the exterior member 51 in the axis direction may be fixed to the electric wire 30 by the tape member 52.

The substrate 54 of the tape member 52 does not necessarily need to be composed mainly of an acetate fiber as long as the substrate 54 is made of a woven fabric or a nonwoven fabric.

In the embodiment given above, the covering member 50 includes the exterior member 51 and the tape member 52. However, the covering member 50 does not necessarily need to include the exterior member 51. That is, the covering member 50 may include only the tape member 52.

In the embodiment given above, the elastic member 70 presses the outer circumferential surface of a portion of each tape member 52 that is wound around the outer circumference of the electric wire 30 and the braided wire 40. For this reason, the clamp 16 holds a portion of each of the conductive paths 11, 12, and 13 around which the tape member 52 is wound and the exterior member 51 is not provided. However, the portion of each of the conductive paths 11, 12, and 13 that is held by the clamp 16 is not limited thereto.

For example, the elastic member 70 may be pressed against a portion of the exterior member 51 of the embodiment given above around which the tape member 52 is not wound. That is, the elastic member 70 may be pressed against the outer circumferential surface of the exterior member 51. In this case, the outer circumferential surface of the exterior member 51 serves as the uneven surface with a large number of fine irregularities. As a result of the exterior member 51 being made using, for example, a sheet-like woven fabric or a sheet-like nonwoven fabric, the outer circumferential surface becomes the uneven surface. In this case, the tape member 52 does not necessarily need to have the uneven surface 55, and thus a vinyl tape or the like may be used as the tape member 52. Furthermore, in this case, the covering member 50 may not include the tape member 52.

With this configuration, the exterior member 51 is made using a woven fabric or a nonwoven fabric, and thus the uneven surface is easily formed on the outer circumferential surface of the exterior member 51. Also, the elastic member 70 is pressed against the uneven surface of the exterior member 51, and thus a friction force between the exterior member 51 and the elastic member 70 can be increased. Accordingly, it is possible to easily suppress a situation in which the electric wire 30 moves relative to the clamp 16 in the axis direction of the electric wire 30.

Also, for example, the elastic member 70 may be pressed against a portion of the outer circumference of the exterior member 51 of the covering member 50 of the embodiment given above around which the tape member 52 is wound, That is, the elastic member 70 may be pressed against the outer circumferential surface of the tape member 52 at a portion where the exterior member 51 and the tape member 52 are overlaid in the radial direction of the electric wire 30. With this configuration as well, the elastic member 70 is pressed against the uneven surface 55 of the covering member 50, and thus a friction force between the covering member 50 and the elastic member 70 is increased. Accordingly, the covering member 50 that covers the outer circumferential surface of the electric wire 30 is unlikely to move relative to the clamp 16 in the axis direction of the electric wire 30. As a result, it is possible to suppress a situation in which the electric wire 30 moves relative to the clamp 16 in the axis direction of the electric wire 30.

Figure 5:
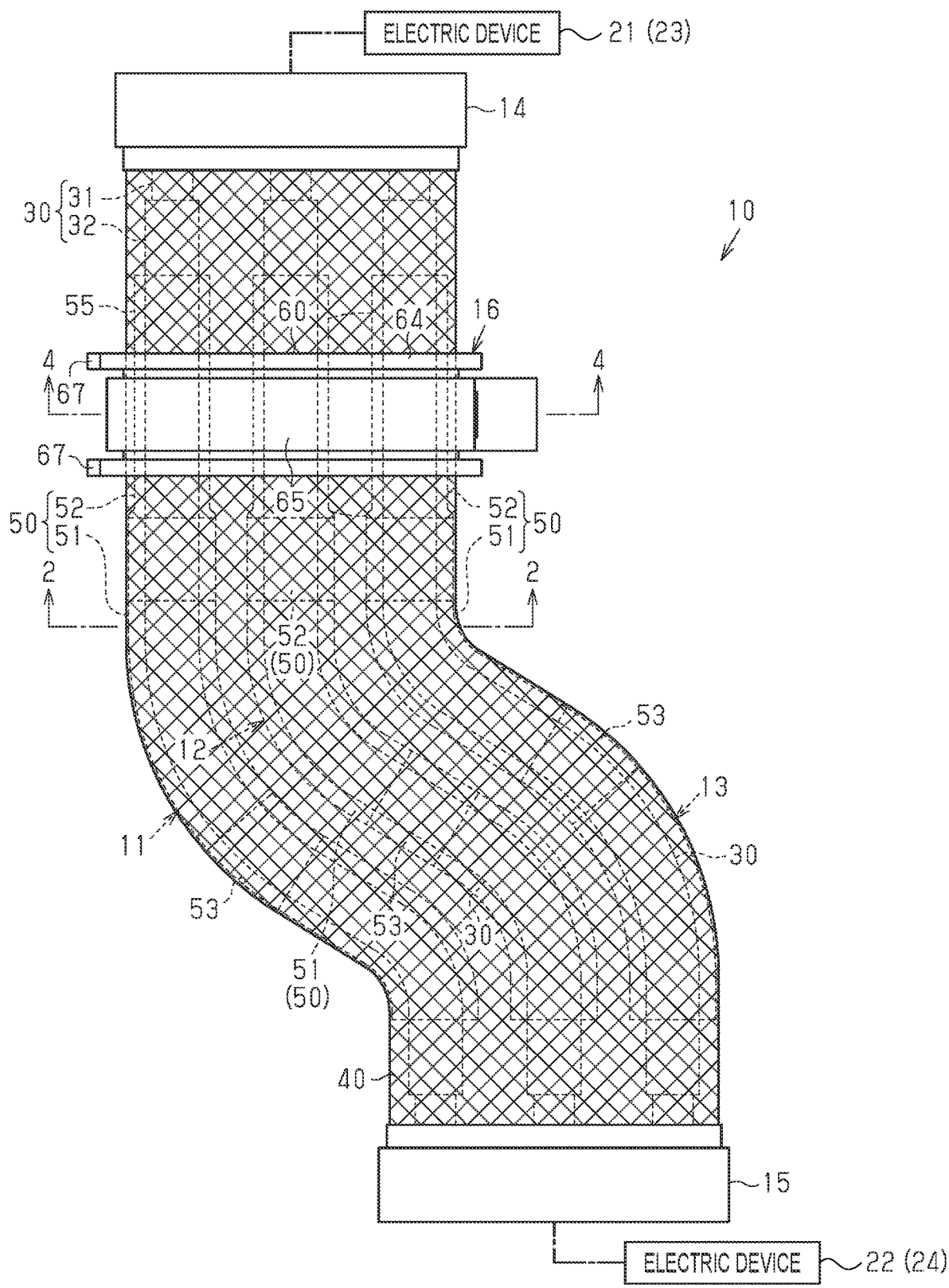
FIG. 5 is a schematic view of a wire harness according to a variation.

In the embodiment given above, three electric wires 30 are each individually covered by braided wires 40. However, it is possible to use, for example, a configuration as shown in FIG. 5 in which a plurality of electric wires 30 each individually covered by covering members 50 are collectively covered by one braided wire 40. In this case, the wire harness 10 includes a number of covering members 50 that is the same as the number of electric wires 30. The plurality of electric wires 30 are collectively provided within the braided wire 40 together with the covering members 50. The uneven surface of each covering member 50 is exposed to the outside of the braided wire 40 from the holes of the mesh made of strands that constitute the braided wire 40. The uneven surface may be formed on the outer circumferential surface of the exterior member 51 or the surface of the tape member 52. The elastic member 70 is brought into contact with the uneven surface of each covering member 50 exposed to the outside of the braided wire 40 from the holes of the mesh made of strands that constitute the braided wire 40.

With this configuration as well, the elastic member 70 is pressed against the uneven surface 55 of the covering member 50, and thus a friction force between the covering member 50 and the elastic member 70 is increased. Accordingly, the covering member 50 that covers the outer circumferential surface of the electric wire 30 is unlikely to move relative to the clamp 16 in the axis direction of the electric wire 30. As a result, it is possible to suppress a situation in which the electric wire 30 moves relative to the clamp 16 in the axis direction of the electric wire 30.

Also, a plurality of electric wires 30 are collectively covered by one braided wire 40, and thus the number of components can be reduced as compared with a configuration in which a plurality of electric wires 30 are each independently covered by braided wires 40.

Also, in the wire harness, the elastic member 70 is brought into contact with the braided wire 40 that is a member provided on the outermost circumference side among the members provided in a layered manner on the outer circumference of the electric wire 30 excluding the clamp 16, and presses the braided wire 40 toward the electric wire 30. For this reason, the braided wire 40 can be embedded into the elastic member 70. Accordingly, a situation is suppressed in which the braided wire 40 moves relative to the clamp 16 in the axis direction of the electric wire 30. As a result, it is possible to suppress a situation in which the electric wire 30 provided within the braided wire 40 moves relative to the clamp 16 in the axis direction of the electric wire 30.

Also, the clamp 16 presses the braided wire 40 that is the member provided on the outermost circumference side among the members provided in a layered manner on the outer circumference of the electric wire 30 excluding the clamp 16 toward the electric wire 30. For this reason, deformation toward the outer circumference side of the braided wire 40 is suppressed by the clamp 16. Accordingly, it is possible to suppress a situation in which the braided wire 40 comes into contact with an object such as a device that is provided in the vicinity of the wire harness 10 when, for example, the wire harness 10 is vibrated due to vibration of the vehicle while running, and thus the occurrence of noise caused by the braided wire 40 coming into contact with an object in the vicinity of the wire harness 10 can be suppressed.

The wire harness 10 does not necessarily need to include the braided wire 40. For example, it is possible to use a configuration in which at least one of the conductive paths 11, 12, and 13 does not include the braided wire 40. In a conductive path that does not include the braided wire 40, the covering member 50 can directly cover the outer circumferential surface of the electric wire 30 without providing a member between the covering member 50 and the electric wire 30.

The configuration of the clamp 16 is not limited to that described in the embodiment given above. It is sufficient that the clamp 16 includes: an elastic member that is made of an elastic body and is brought into contact with the uneven surface 55 of the covering member 50; and a fixing member 60 that presses the elastic member against the uneven surface 55 and is fixed to the vehicle body. For example, in the clamp 16 of the embodiment given above, each of the two gripping bodies 66 may have a flat plate-like shape. In this case, the elastic member 70 may be formed to have a rectangular outer shape so as to be easily held between the two opposing gripping bodies 66. Also, in this case, the elastic member 70 may not include the insertion holes 71, 72, and 73, and may be provided between the gripping bodies 66 and the conductive paths 11, 12, and 13 in the opposing direction of the two gripping bodies 66. In this case, as the material of the elastic member 70, a butyl tape may also be used.

In the embodiment given above, the electric wires 30 are non-shielded electric wires that do not have an electromagnetic shielding structure. However, the electric wires 30 may be shielded electric wires that have an electromagnetic shielding structure.

In the embodiment given above, the three conductive paths 11, 12, and 13 have the same configuration. However, the conductive paths 11, 12, and 13 may have mutually different configurations as long as, in each of the conductive paths 11, 12, and 13, the surface of the covering member 50 that is provided on a side opposite to the electric wire 30 is an uneven surface with a large number of fine irregularities. Also, the number of electric wires 30 included in the wire harness 10 is not limited to three, and it is sufficient that the number of electric wires 30 included in the wire harness 10 is one or more.

In the embodiment given above, the inverter 23 and the motor 24 are used as examples of the electric devices 21 and 22 that are connected by the wire harness 10. However, the electric devices 21 and 22 that are connected by the wire harness 10 are not limited thereto, and it is sufficient that the electric devices 21 and 22 that are connected by the wire harness 10 are electric devices that can be mounted in a vehicle. The electric devices include a control device and the like. For example, the wire harness 10 may be used to connect the inverter 23 and a high-voltage battery. Alternatively, the wire harness 10 may be used to connect a low-voltage battery that can supply voltage (for example, at 12 volts) lower than that of the above-described high-voltage battery and an electric device that needs to be connected to the low-voltage battery. For example, the wire harness 10 may be used to connect a low-voltage battery and an air conditioner.

In the example shown in FIG. 1, a plurality of electric wires 30 are arranged in a direction perpendicular to the axis direction of the electric wires 30, The positions of the tape members 52 in the axis direction of the electric wires 30 overlap each other in a direction perpendicular to the axis direction of the electric wire 30. The plurality of electric wires 30 are fixed to the vehicle body using, for example, one clamp 16.

As shown in FIG. 1, the clamp 16 may be provided at a first length position in the entire length of the wire harness 10. The first length position may be, for example, between the connector 14 and the open end portion of the exterior member 51.

The tape member 52 of the embodiment may also be referred to as "insulating fiber tape". The acetate fiber of the embodiment may also be referred to as "insulating fiber".

As shown in FIG. 4, the elastic member 70 may be configured such that the plurality of electric wires 30 (or the conductive paths 11, 12, and 13) are radially spaced apart from each other to prevent the plurality of electric wires 30 (or the conductive paths 11, 12, and 13) from coming into contact with each other, and may also be referred to as "spacer".

The present disclosure encompasses the following aspects. Reference numerals of some of the constituent elements of the exemplary embodiment are assigned to facilitate the understanding of the aspects, and thus are not construed as limiting. Some of the features described in the following aspects may be omitted, or may be selected or extracted and used in combination.

[Additional Statement 1] In some aspects of the present disclosure, the covering member (50) may cover the outer circumferential surface of the electric wire (30) in a state in which the covering member (50) is prevented from moving relative to the electric wire (30).

[Additional. Statement 2] In some aspects of the present disclosure, the covering member (50) includes the cylindrical exterior member (51) that covers the outer circumferential surface of the electric wire (30) and the tape member (52). The tape member (52) may fix the exterior member (51) to the electric wire (30) by being wound around both of the outer circumference of the exterior member (51) and the outer circumference of the electric wire (30).

[Additional Statement 3] In some aspects of the present disclosure, the uneven surface (55) may have irregularities sized to be closely attached to the elastic member (70) without a gap.

[Additional Statement 4] In some aspects of the present disclosure, the large number of fine irregularities of the uneven surface (55) may be formed due to surface properties of a woven fabric or a nonwoven fabric.

[Additional Statement 5] A wire harness (10) according to some aspects of the present disclosure includes:
  a plurality of electric wires (30);
  a plurality of covering members (50) that cover outer circumferential surfaces of the plurality of electric wires (30); and
  a clamp (16) for fixing the plurality of electric wires (30) to a vehicle body,
  wherein, in each of the covering members (50), a surface that is provided on a side opposite to the electric wire (30) includes an uneven surface (55) with a large number of fine irregularities,
  the plurality of electric wires (30) are arranged in a radial direction of the electric wires (30),
  positions of the uneven surfaces (55) of the plurality of covering members (50) in an axis direction of the electric wires (30) overlap each other in the radial direction of the electric wires (30),
  the clamp (16) includes: an elastic member 70 that is made of an elastic body and is brought into contact with the uneven surfaces (55) of the plurality of covering members (55); and a fixing member (60) that presses the elastic member (70) against the uneven surfaces (55) and is fixed to a vehicle body.

[Additional Statement 6] In some aspects of the present disclosure, a wire harness (10) may include:

an electric wire (30);
a clamp (16) for fixing the electric wire (30) to a vehicle body, the clamp (16) being provided at a first length position in the wire harness (10); and
an insulating fiber tape (52) that includes a radially inward-facing surface that is closely attached or adhesively attached to a radially outward-facing surface of the electric wire (30) at at least the first length position in the wire harness (10),
wherein the clamp (16) may include:
a fixing member (60) that is configured to be fixedly attached to a vehicle body; and
an elastic member (70) that is brought into contact with a radially outward-facing surface of the insulating fiber tape (52),
the clamp (16) may be configured to press the elastic member (70) toward the radially outward-facing surface of the insulating fiber tape (52) at the first length position in the wire harness (10) to engage the elastic member (70) with irregularities of the insulating fiber tape (52) formed by an insulating fiber.

[Additional Statement 7] In some aspects of the present disclosure, a wire harness (10) may include:
a plurality of electric wires (30);
a clamp (16) for fixing the plurality of electric wires (30) to a vehicle body, the clamp (16) being provided at a first length position in the wire harness (10); and
a plurality of insulating fiber tape strips (52) that have a plurality of radially inward-facing surfaces (55) that are closely attached or adhesively attached to a plurality of radially outward-facing surfaces of the plurality of electric wires (30) at at least the first length position in the wire harness (10),
wherein the clamp (16) may be configured to press the elastic member (70) toward the plurality of radially outward-facing surfaces (55) of the plurality of insulating fiber tape strips (52) at the first length position in the wire harness (10) to engage the elastic member (70) with irregularities of the insulating fiber tape strips (52) formed by an insulating fiber.

[Additional Statement 8] In some aspects of the present disclosure, the radially inward-facing surface of the insulating fiber tape (52) may be closely attached or adhesively attached to the radially outward-facing surface of the electric wire (30) such that the radially inward-facing surface of the insulating fiber tape (52) and the radially outward-facing surface of the electric wire (30) do not move relative to each other in an axis direction and a radial direction of the electric wire (30).

[Additional Statement 9] In one aspect of the present disclosure, the radially inward-facing surface of the insulating fiber tape (52) may be an adhesive surface that contains an adhesive, and the radially outward-facing surface of the insulating fiber tape (52) may be a non-adhesive surface that does not contain an adhesive.

[Additional Statement 10] In one aspect of the present disclosure, the insulating fiber of the insulating fiber tape (52) may be an acetate fiber.

[Additional Statement 11] In one aspect of the present disclosure, the clamp (16) may be configured to compress the elastic member (70) and the insulating fiber tape (52) at a position between the fixing member (60) and the radially outward-facing surface of the electric wire (30).

[Additional Statement 12] In one aspect of the present disclosure, the fixing member (60) of the clamp (16) may bundle and/or extend across the plurality of electric wires (30) at the first length position in the wire harness (10).

[Additional Statement 13] In one aspect of the present disclosure, the elastic member (70) of the clamp (16) may be a spacer that radially spaces the plurality of electric wires (30) such that the plurality of electric wires (30) do not come into contact with each other at the first length position in the wire harness (10).

[Additional Statement 14] In one aspect of the present disclosure, the wire harness (10) may include an exterior member (51) that covers a predetermined length of the electric wire (30),
the insulating fiber tape (52) may connect the exterior member (51) and the electric wire (30) such that the exterior member (51) does not cover the electric wire (30) at the first length position in the wire harness (10),
and a radially inward-facing surface of the exterior member (51) is permitted to move relative to the radially outward-facing surface of the electric wire (30) with leeway at an intermediate portion of the exterior member (51) excluding end portions of the exterior member (51).

[Additional Statement 15] In one aspect of the present disclosure, the wire harness (10) may include a connector (14 or 15) at least one end of the electric wire (30), and
the first length position in the wire harness (10) may be a position between the connector (14 or 15) and the exterior member (51).

The invention claimed is:
1. A wire harness comprising:
an electric wire;
a cover that covers an outer circumferential surface of the electric wire; and
a clamp for fixing the electric wire to a vehicle body, wherein:
a surface of the cover that is provided on a side opposite to the electric wire includes an uneven surface with a plurality of irregularities,
the clamp includes:
an elastic member that is made of an elastic body and is brought into contact with the uneven surface; and
a fixing member that presses the elastic member against the uneven surface and is fixed to the vehicle body,
the cover includes:
a cylindrical exterior that covers the outer circumferential surface of the electric wire; and
a tape that fixes the exterior to the electric wire by being wound around an outer circumference of the exterior and an outer circumference of the electric wire,
the tape includes a substrate that is made of a woven fabric or a nonwoven fabric and has an adhesive-applied surface in a thickness direction of the tape, and
the uneven surface is the other surface of the substrate in the thickness direction.

2. The wire harness according to claim 1,
wherein the tape is wound around the exterior only at one of two ends of the exterior in an axis direction of the exterior.

3. The wire harness according to claim 1, wherein:
the exterior is made of a sheet woven fabric or a sheet nonwoven fabric.

4. The wire harness according to claim 1, comprising
a braided wire that is composed of conductive strands that are braided into a cylindrical shape, wherein the braided wire is provided within the exterior and the tape and covers the outer circumference of the electric wire.

5. The wire harness according to claim 1, wherein:
the cylindrical exterior is made of a woven fabric or a nonwoven fabric.

6. The wire harness according to claim 1, comprising:
a braided wire composed of conductive strands that are braided into a cylindrical shape,
a plurality of electric wires that includes the electric wire,
a plurality of covers that includes the cover, wherein:
- each wire of the plurality of electric wires is individually covered by a respective cover of the plurality of covers,
- the plurality of electric wires are collectively provided within the braided wire together with the plurality of covers, and
- the elastic member is brought into contact with the uneven surfaces of the plurality of covers exposed to an outside of the braided wire from holes of a mesh made of the strands.

\* \* \* \* \*